May 15, 1956     R. H. BLOOD ET AL     2,745,496
FORMATION TESTING APPARATUS Original Filed May 22, 1948     8 Sheets-Sheet 3

FIG.-3

Robert H. Blood
Ben W. Sewell    Inventors

By W. N. Wright   Attorney

Fig. 4.

Robert H. Blood
Ben W. Sewell — Inventors

By W. N. Wright, Attorney

May 15, 1956  R. H. BLOOD ET AL  2,745,496
FORMATION TESTING APPARATUS
Original Filed May 22, 1948  8 Sheets—Sheet 5

FIG-5

Robert H. Blood
Ben W. Sewell   Inventors

By W. N. Wright  Attorney

FIG.6

May 15, 1956   R. H. BLOOD ET AL   2,745,496
FORMATION TESTING APPARATUS
Original Filed May 22, 1948   8 Sheets-Sheet 7

Robert H. Blood
Ben W. Sewell   Inventors

By *A. N. Wright*   Attorney

May 15, 1956  R. H. BLOOD ET AL  2,745,496
FORMATION TESTING APPARATUS
Original Filed May 22, 1948  8 Sheets-Sheet 8

Fig. 9.

Robert H. Blood
Ben W. Sewell     Inventors

By W. N. Wright  Attorney

United States Patent Office

2,745,496
Patented May 15, 1956

2,745,496

FORMATION TESTING APPARATUS

Robert H. Blood and Ben W. Sewell, Tulsa, Okla., assignors to Esso Research and Engineering Company, a corporation of Delaware Continuation of application Serial No. 28,698, May 22, 1948. This application October 27, 1953, Serial No. 388,647

7 Claims. (Cl. 166—152)

The present invention relates to an improved type of formation tester for use in testing the fluids of an oil well. In particular it relates to a balloon type formation tester adapted to be dropped down the drill string associated with a conventional coring bit so as to permit sampling of the fluid at the bottom of the well below the coring bit.

This application is a continuation of co-pending application Serial No. 28,698, filed May 22, 1948, now abandoned.

In conventional oil well drilling operations, in which a well hole is bored in the earth in order to locate strata from which oil may be obtained, it is necessary to adopt a rather cumbersome procedure to test formations, during drilling, for the presence or absence of oil. This is so because of the necessity of having the borehole filled with drilling mud. By maintaining the hole full of drilling mud, a sufficient hydrostatic pressure is maintained on all formations through which the hole passes so that gases or other fluids under pressure in the formations will not be released. Alternatively, if this procedure is not followed; that is, if drilling mud is not maintained in the hole as the drilling tool penetrates formations having fluids under high pressures, these fluids would blow to the surface of the earth, endangering both equipment and personnel. It is apparent that because of the presence of drilling mud in the borehole, special techniques must be used in order that fluid samples may be suitably obtained from the formations encountered. These techniques are generally referred to by the descriptive title "formation testing."

The procedures generally followed for formation testing involve the use of elastic packers mounted on various types of apparatus that are attached to the end of a drill pipe that is employed for rotating the bit during drilling operations. These procedures necessitate removal of the drill pipe from the hole for attachment of the testing tools, and again at the completion of each test for reattachment of the drilling bit. Such procedures are time-consuming and expensive. The solid rubber mechanical packers commonly used are often destroyed in a single test and must be replaced. The ratio of their expansion is quite limited, which often prevents their sealing a hole that has been washed out or has caved to an unusually large diameter.

Consequently, many efforts have been made to improve formation testing techniques. Apparatus has been developed employing inflatable elastic packers in conjunction with proper valve assistance to permit sealing the well off at a given point, and to permit lowering the hydrostatic pressure of the drilling mud at that point to remove a sample of the fluid. Use of such inflatable packers is especially attractive since an inflatable packer can thoroughly seal off the well in the expanded position, and yet may readily be removed from the well, or through equipment in the well, in the deflated position. Furthermore, it is possible to position such a packer at any desired point in the well so as to selectively obtain a sample of the fluid from a particular stratum.

It is the principal object of this invention to provide an improved type of inflatable elastic packer formation tester of simple yet effective construction, the tester being particularly adapted to be use in conjunction with, and without the removal from the well of, conventional drilling equipment.

The novel formation tester of the present invention is employed in conjunction with a conventional coring bit. The formation tester is adapted to be lowered down the drill pipe, through the coring opening of the core bit, into the borehole adjacent a stratum to be sampled. Inflatable packing means are provided to seal off the well below the core bit and to permit extracting a sample of the fluid from the stratum below the care bit. After a sample has been extracted the elastic packer may be deflated and pulled upwardly through the drill string to permit continued operations with the core bit. By this means it is possible to sample formations with only minimum interference with normal drilling operations.

The accompanying drawings depict a preferred embodiment of a formation tester of this invention, the tester being shown in position in a bore hole. For convenience, the bore hole is omitted from some of the figures.

Referring now to the several figures, the general construction and use of the apparatus of this invention may be explained. The numeral 1 designates a bore hole which may have been made in the earth by any conventional type of drilling equipment. It is assumed, however, that just prior to the formation testing, a core bit assembly has been used in the well. This core bit assembly is supported on a conventional drill string, the lower portion of which is indicated by the numeral 2. Threaded on to the lower end of the drill string 2 is a further section of pipe indicated by the numeral 3 which serves as a support for the core bit 4. Most conveniently, the core bit, the pipe supporting the core bit, and the conventional drill string are connected by threaded connections, as illustrated. Alternatively, integral construction may be used where desired. As will become apparent, any of the conventional types of drill strings and core bits may be employed. It is only necessary that the drill string at, or adjacent, the connection with the pipe 3 supporting the core bit provide a suitable internal shoulder 5, shown in Figure 4. Alternatively, if desired, an annular ring of reduced cross section may be provided either in the drill pipe 2 itself, or in the core bit support 3. However, it is preferred, as shown in the drawing, that the junction of the drill pipe 2 with the core bit support 3 be such that a shoulder is provided.

It should be noted that many of the parts of the tester that would ordinarily be constructed of separate units to facilitate assembly or dismantling are shown as combined into integral pieces in order to simplify the drawing.

Figure 1:
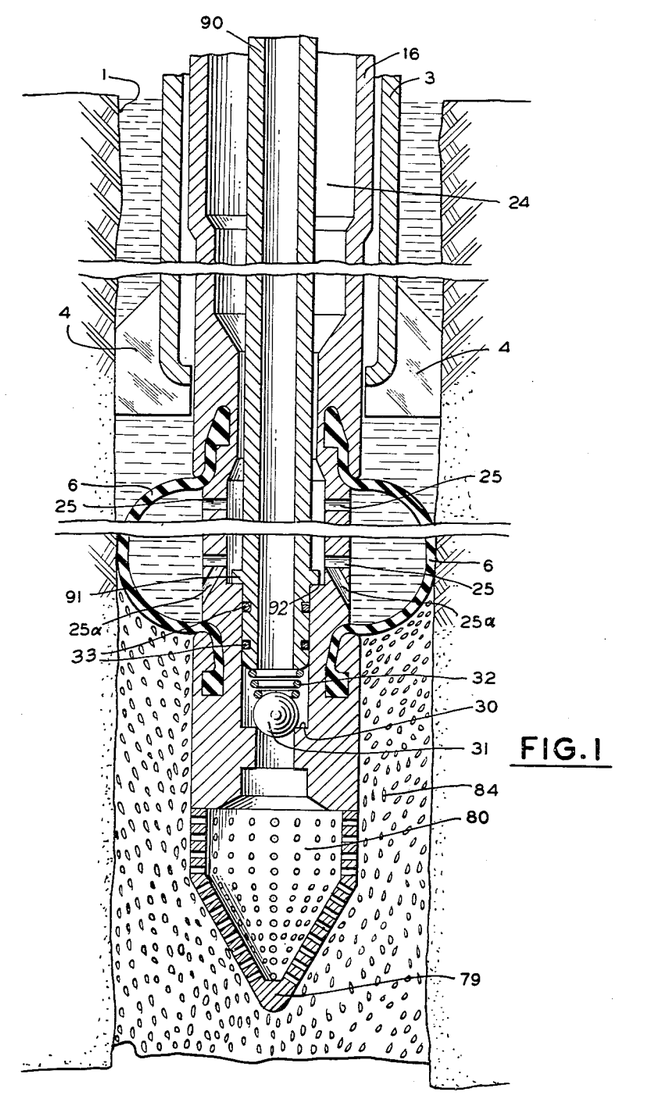
Figure 1 is an elevational view, in section, of the lower-most portion of the device, showing the testing ports, the inflatable packer and the coring bit.

Extending through most of the length of the formation tester is a packer support body 16 that terminates at its lower end in a nose portion 79. An inflatable elastic packer 6 is supported on the exterior of a lower portion of support body 16, this portion of the support body being of slightly reduced external diameter to accommodate the packer in its deflated position. While the elastic packer 6 is shown in the inflated position in Figure 1, it is to be understood that the packer will be in the deflated position when the formation tester is being lowered down through the drill string and through the core bit. Support body 16 is thus necessarily of sufficiently small external diameter to pass through the core bit 4. It will be seen that support body 16 is an essentially tubular member whose external diameter is more or less uniform over most of its length except at its top portion, which is of considerably smaller diameter (Figures 3 and 4).

At the point at which support body 16 first becomes of smaller exterior diameter a shoulder 15 is provided to serve as a support for the lower end of an elastic mechanical packer 14 which is positioned around the support body 16. A mechanical packer of this type is usually made of rubber. Slidably surrounding support body 16 above the mechanical packer 14 and resting on the packer is a cylindrical member 9 of essentially uniform external diameter sufficiently small to permit the member 9 to fit within the drill pipe 2. Thus the cylindrical member 9 is of somewhat the same external diameter as the lower major portion of support body 16.

One or more latching dogs 11 are pivotally supported on an upper portion of cylindrical member 9 by means of pins 12, suitable slots being provided in member 9 to accommodate the dogs. Springs 13 fastened to cylindrical member 9 act to urge the latching dogs outwardly as shown.

Figure 3:
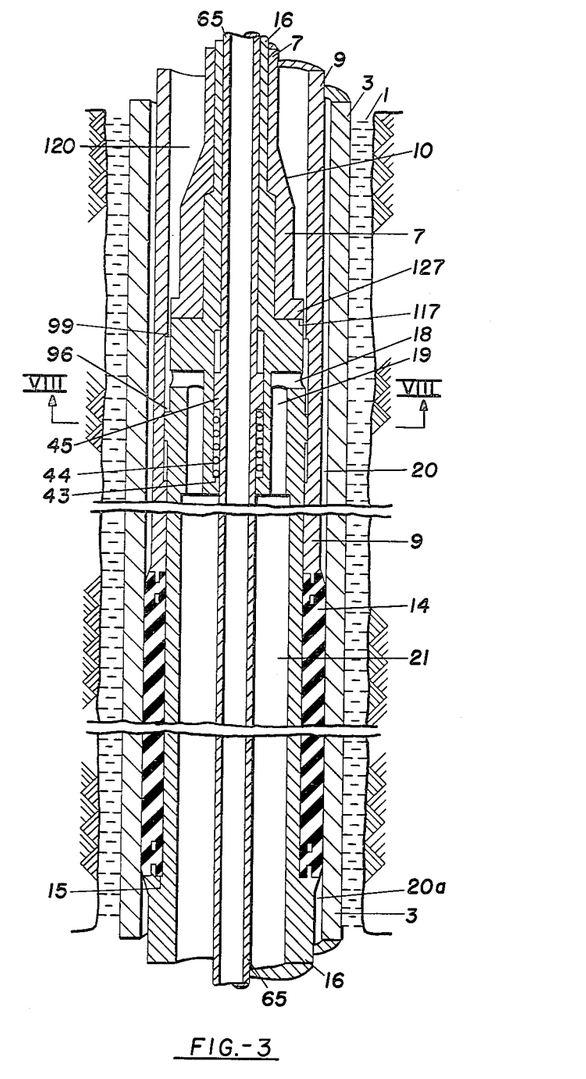
Figures 3 and 4 are upper continuations of Figures 2 and 3, respectively, and show the mechanical packer and the latching dog and lever assemblies that are provided for proper manipulation of the apparatus.
Figure 4:
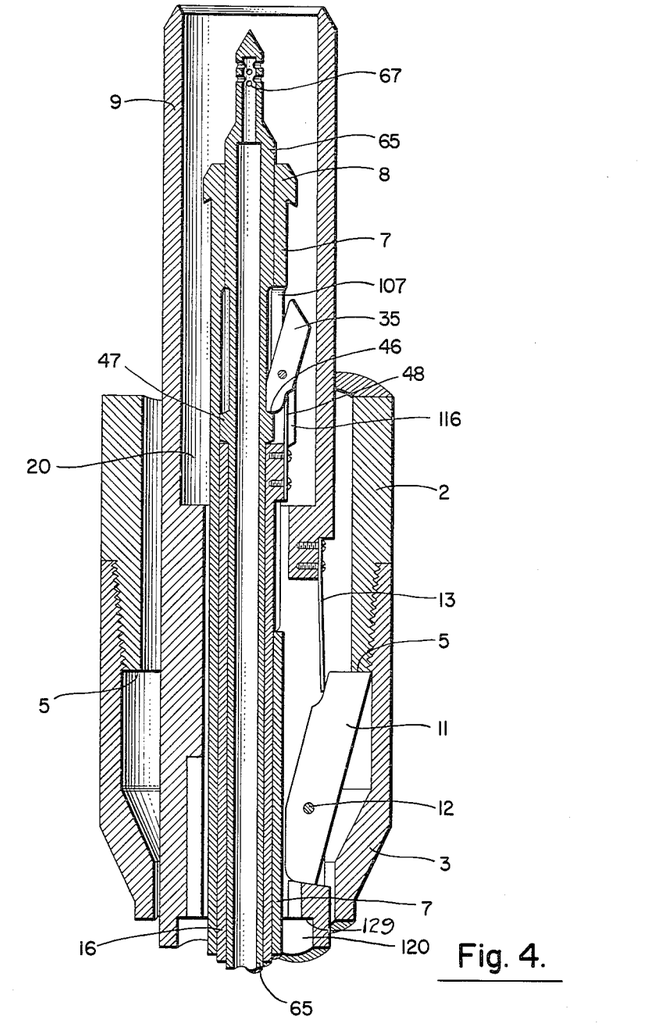

Slidably surrounding support member 16 at its upper end where it is of smallest external diameter is a tubular member 7 that fits within cylindrical member 9 and terminates at its lower end, as shown in Figure 3, in a tapered section 10 that is adapted for camming engagement with the latching dogs 11. The lower end of member 7 is adapted to rest on an upward facing shoulder 117 on support body 16 at the point where the latter body is reduced to essentially its smallest diameter. The lower end of tubular member 7 also has an upward facing exterior shoulder 127 that is adapted to engage a downward facing shoulder 129 on the interior of member 9 just below the latching dogs 11 (Figure 4). Therefore, if member 7 is lifted upwardly, it will slide in relation to member 9 until shoulders 127 and 129 engage, whereupon the lifting action will be transferred to member 9. The upper end of tubular member 7 terminates in a spearhead 8 which serves as a suitable support for lowering and retrieving the formation tester in the well.

Since cylindrical members 7 and 9 are in slidable relation to each other, when the cylindrical member 7 is caused to slide upward in relation to member 9, as by lifting member 7 with means engaging spearhead 8, the cam portion 10 will move upwardly and engage the lower end of the latching dog 11 so as to cause the upper end of the latching dogs to be pulled inward. When the cylindrical member 7 is not in the upward position but is resting in a downward position on shoulder 117, the latching dogs 11 are urged outward by springs 13. There is sufficient clearance between member 7 and dogs 11 to allow the dogs to move inward. This freedom is required to let the dogs pass through restrictions that may be encountered on the way down the drill pipe bore.

The outward pressure of the springs upon the dogs assures proper engagement of the dogs with shoulder 5. By this means the position of the latching dogs 11 may be controlled to be in the extended position as shown, suitable for engaging the shoulder 5 of the drill pipe 2, or the latching dogs may be retracted so as to avoid the shoulder 5. The necessity for this provision will become apparent.

In order to control the hydrostatic pressure within the drill string for purposes of inflating the elastic packer and subsequently withdrawing a fluid sample from the formation being tested, it is necessary that a seal be established between the fluid in the upper part of the drill string 2, and the openings of the coring bit 4, which allow fluid access to the fluid in the well. As shown in Figure 3, the passageway defined by cylindrical member 9 and core bit support 3, i. e. annulus 20, may be sealed off from the passageway defined by support body 16 and core bit support 3, i. e. annulus 20a, by expansion of packer 14. The lower end of member 9 rests on the upper edge of packer 14. Therefore, downward movement of member 9 relative to member 16 will compress packer 14 and expand it against core bit support pipe 3. It will thus be seen that with the tool resting on the bottom of the borehole and with latching dogs 11 engaging shoulders 5, if a portion of the weight of the drill string is exerted on the dogs, member 9 will slide downward with respect to member 16 and expand packer 14. Excessive downward travel of member 9 relative to member 16 is prevented by engagement of shoulder 99 on member 9 with shoulder 96 on member 16.

Positioned within the bore of the lower portion of support body 16 is a formation sample tube 90, the bore of body 16 being such that it receives the upper and lower ends of tube 90 with a snug fit, whereas the bore intermediate these regions is enlarged so as to define with the tube 90 an annular passage 24. Sample tube 90 is supported at its lower end by means of a ring 91 that rests on an up-facing shoulder 92 at the lower end of the enlarged bore just referred to. Another up-facing shoulder 30 at the lower end of the bore of support body 16 serves as the seat for a ball check valve 31 which is backed by a spring 32, the latter being held in compression by the lower end of tube 90. Thus check valve 31 will permit upward flow of fluid into the bore of tube 90 but will prevent fluid flow in the opposite direction. Valve 31 may be referred to as a production valve. Ring seals 33, which are positioned in exterior annular grooves in the lower end of tube 90, prevent leakage of fluid from the annular passage 24 into the bore of body 16 below the tube 90.

Fitting slidably within the bore of the upper part of support body 16 and extending on up within the bore of tubular member 7 to a point above the top of the latter member is a valve-operating sleeve 65 which extends downwardly within the apparatus to a point where the lower end of sleeve 65 fits slidably within the top portion of the bore of formation fluid sample tube 90. The upper portion of sleeve 65 that extends beyond the top of support body 16 is of enlarged external diameter so as to fit closely within the upper bore of tubular member 7.

The bore of support body 16 intermediate the ends of sleeve 65 is enlarged so as to define therewith an annular passage 21. In the region of body 16 where the central bore is restricted so as to slidably receive the lower end of sleeve 65 an off-center bore 22 is also provided, communicating at its upper end with annular passage 21 and communicating at its lower end with annular passage 24 through a smaller off-center bore 122, which is concentric with bore 22. The ends of the bore 22 are closed off with ported partitions or plates 61 and 62 so as to define between them a chamber which may be termed a valve chamber. Fluid access to this valve chamber is provided by ports 52 in each of the plates. Within this valve chamber is a check valve 23 whose function will be described in detail later in the specification.

Figure 2:
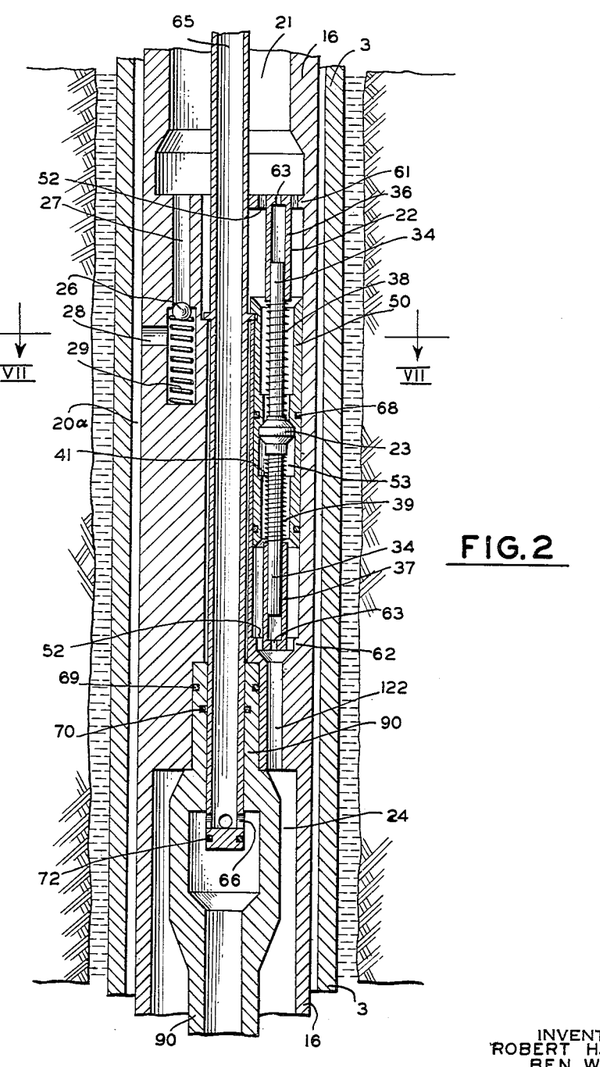
Figure 2 is an upper continuation of Figure 1 and shows the reversible inflation-deflation valve for the inflatable packer.
Figure 6:
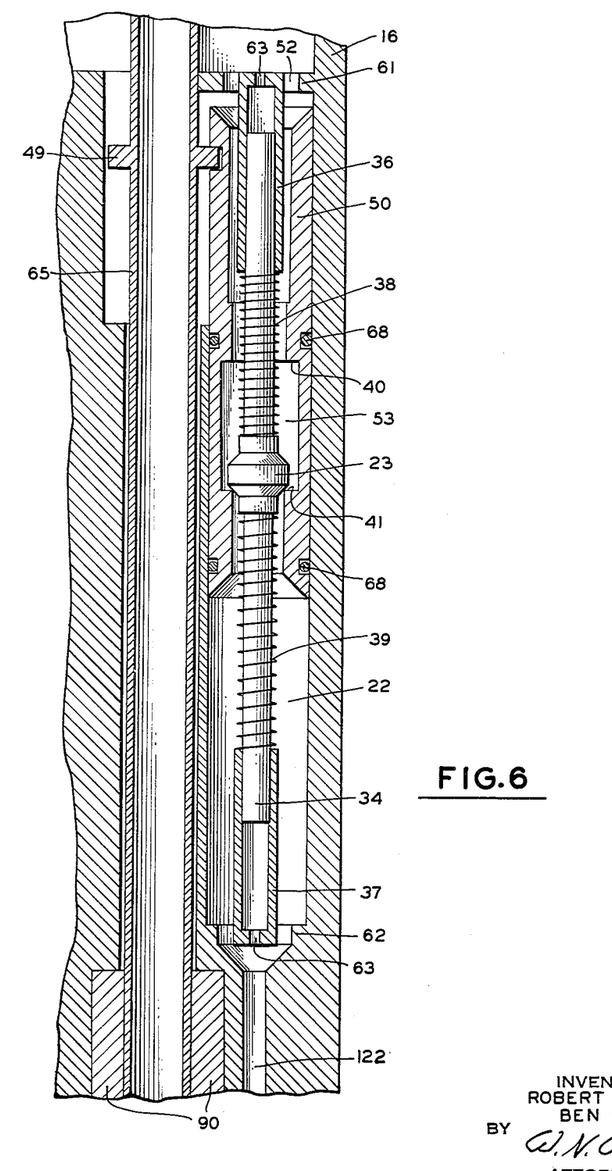
Figure 6 is an enlarged view of a portion of Figure 2, showing the inflation-deflation valve in its alternate position.
Figure 7:
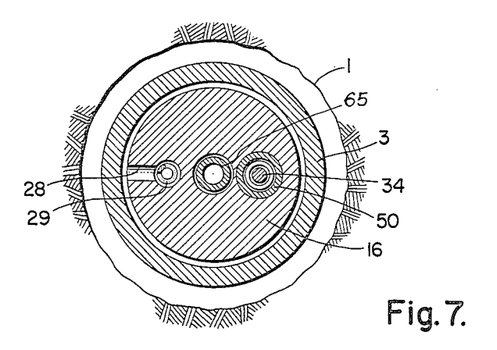
Figures 7 and 8 are cross sections taken on line VII—VII and line VIII—VIII of Figures 2 and 3, respectively.
Figure 8:
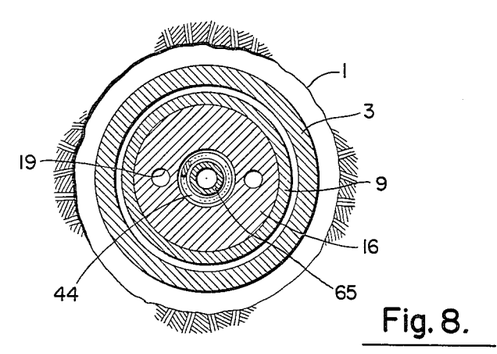

As shown in Fig. 2, and more clearly in Fig. 6, the valve mechanism including valve 23 comprises a valve sleeve 50 which fits slidably within bore 22. Attached to plates 61 and 62 are upper and lower tubular supports 36 and 37 within which is slidably held a vertical rod 34. Valve 23 is supported at the center of rod 34 and has upper and lower conical faces. Sleeve 50 has a central chamber 53, in which valve 23 is placed. This chamber is defined by an upper valve shoulder 40 against which the upper conical face of member 23 may seat and a lower valve shoulder 41 against which the lower conical face of valve 23 may seat. By shifting valve sleeve 50 in a manner to be described later it is possible to shift the positions of the shoulders 40 and 41 so that valve 23 will seal either the opening surrounded by shoulder 40 or the opening surrounded by shoulder 41. Springs 38 and 39, positioned between each conical face of the valve member 23 and the upper and lower tubular supports 36 and 37 would normally support valve member 23 about midway between those supports. However, with valve sleeve 50 in the position shown in Figure 2, shoulder 40 has pushed the valve 23 down so that the compression in spring 38 is relieved and that spring 39 has been increased, holding valve member 23 in sealing position against the shoulder 40. When valve sleeve 50 has been shifted to the position shown in Figure 6, valve 23 is similarly held in sealing position against shoulder 41.

When valve body or sleeve 50 is in the position shown in Figure 2, valve member 23 is in contact with shoulder 40, spring 39 thus being in compression and spring 38 being decompressed. Thus valve 23 in the position shown serves as a check valve permitting downward flow of fluid and preventing upward flow of fluid. Valve 23 in this position may thus be referred to as the inflation valve. Downward travel of valve rod 34 is limited by plate 62 so that valve 23 will not come to bear on shoulder 41 and restrict flow of fluid downward through the valve. When sleeve 50 is shifted upward, by means later to be described, to the position shown in Figure 6, valve 23 will be engaged by shoulder 41, spring 38 will be in compression, spring 39 will be decompressed, and the valve will act as a check valve permitting upward flow of fluid and preventing downward flow of fluid, plate 61 limiting the upward travel of rod 34 so as to prevent the seating of valve 23 on shoulder 40. Valve 23 in the latter position may be referred to as the deflation valve.

Ports 63 in plates 61 and 62 communicate with the interior of tubular supports 36 and 37 so that the pressure at both ends of rod 34 will be equalized and thus permit free travel of rod 34 in supports 36 and 37. Ring seals 68 in valve body or sleeve 50, and ring seals 69 and 70 in the top of tube 90, serve to prevent fluid loss from packer 6 through channel 24 and thus maintain inflation of the packer during the test.

Positioned within member 16 adjacent the check valve mechanism just described is a by-pass consisting of a ball valve 26 that fits within an enlargement of a passageway 27, which is an off-center bore that connects passage 21 to port 28 in the side of member 16. Port 28 thus communicates with annular space 20a below packer 14. Valve 26 is held in place by a spring 29 so that the valve will act as a check valve permitting flow outward through port 28 while preventing flow in the opposite direction.

It will be noted that an outer channel for the passage of drilling mud or other fluid from the drill pipe into elastic packer 6 is provided by annulus 20 between the drill pipe 2 and cylindrical member 9, annulus 120 between tubular member 7 and cylindrical member 9 below the locking dogs 11, annulus 21 between packer support member 16 and valve operating sleeve 65, bores 22 and 122, lower annulus 24 and ports 25 and 25a. Fluid communication between annulus 20 and annulus 120 is established through the slots that accommodate the locking dogs 11. Communicating horizontal and vertical bores 18 and 19, positioned in the wall of support member 16, just below the lower end of member 7 establish a fluid passageway between annulus 120 and annulus 21.

An inner channel for the passage of produced fluids from the bore hole below the inflated packer 6 to the open top of member 9 is provided through perforations 80 in nose portion 79 at the bottom of the tester, the bore of formation sample tube 90, ports 66 in the lower end of sleeve 65, the bore of sleeve 65, and ports 67 in the top of sleeve 65.

As substantially all of the parts of the tester have now been identified and described, the method of employing the apparatus may now be explained. When it is desired to test the fluids at the bottom of the well bore, the conventional inner core barrel and the core that has been cut by the bit are retrieved through the drill pipe with a conventional overshot on a wire line. The drill string and core bit are then pulled upwardly in the well a short distance. It is then preferred to drop gravel or other loose packing material down the drill string and through the coring bit to form at the bottom of the well a porous bed, indicated by the numeral 84. The gravel may also be spotted in a place with a dump bailer on a wire line instead of dropping it down the drill pipe. This gravel bed will serve to form a passageway for fluids from strata at or adjacent to the bottom of the well, and will also serve to provide a firm foundation or support for the lower part of the testing apparatus.

When the gravel or other loose packing material has been placed in the well, the apparatus hereinbefore described may be lowered through the drill string, while the elastic packer 6 is in the deflated position. The lowering may be accomplished in one of two ways. The apparatus may be dropped down the bore of the drill pipe and depend on the hydraulic action of the drilling mud within the drill pipe to retard the fall to a safe speed. Alternatively, lowering may be done with a wire line attached to the spearhead of the tool with a conventional overshot, which may then be released and removed from the well. Inasmuch as such overshots are of conventional construction, they need not be described in detail. When the apparatus has reached the bottom of the well and no lifting force is being exerted on cylindrical member 7, the latter will slide by gravity downward relative to member 9 and the latching dogs will be forced outward by the springs 13. By then lowering the drill string in the bore hole, the shoulders 5 of the drill string will be caused to bear on the latching dogs 11, thus forcing the nose of the apparatus firmly into the gravel bed at the bottom of the well. Furthermore the weight of the drill string on the latching dogs 11 will cause relative movement of members 9 and 16 so that cylindrical member 9 will bear downwardly on packer 14, forcing it against shoulder 15 and expanding it so as to seal off the passageway from the drill string 2 through the core bit 4 as formerly described. For the remainder of the formation testing procedure, it is merely necessary to vary the hydrostatic pressure of the fluid in the drill string 2.

The first step is to inflate the elastic packer 6 so as to seal off the portion of the well below the elastic packer. this may readily be accomplished by increasing the pressure of the fluid in the drill string 2. Fluid will thus be caused to flow through annular space 20 past the latching dogs 11 into annular space 120, through passageways 18 and 19 into channel 21, through bore 22, past valve 23 into channel 24, and through ports 25 and 25a to the interior of packer 6. By proper choice of the strength of spring 29, which holds check valve 26, this valve may be adapted to open when the pumping pressure exerted on the fluid has reached a sufficiently high value to ensure proper inflation of the elastic packer. It is thus not necessary to control the pumping pressure used to inflate packer 6, as valve 26 will automatically open if the pressure exceeds the desired value. Alternatively, of course, valve 26 may be dispensed with, although this requires that the pumping pressure exerted on the fluid in the drill string be carefully controlled so as not to provide more pressure than the elastic packer 6 can sustain. In any event sufficient pressure is placed on the fluid within packer 6 so as to expand it against the sides of the bore hole and thus completely seal off the lower part of the well below packer 6. Fluid is prevented by valve 31 from passing through the bores of sleeve 65 and tube 90 into the well below the packer 6.

When elastic packer 6 has been properly inflated the fluid pressure in the drill string may then be reduced by withdrawing a portion of the fluid from the drill string 2, as by conventional swabbing procedures or by use of a bottom-hole pump lowered into the drill string. This will then cause a reduction in the pressure existing throughout the previously described inner channel of the apparatus, comprising the bores of sleeve 65 and of tube 90, resulting in the production valve 31 opening. The decrease in pressure will be transmitted through the perforations 80 of the nose 79 to the porous bed 84. Consequently, fluids contained in this porous bed, or adjacent to it, will be forced upwardly into the apparatus at the time when their pressure exceeds the fluid pressure within the tube 90. Therefore, any fluids existing in the stratum at the bottom of the well will flow through the perforations of the nose 79 upwardly past the production valve 31, through the bore of tube 90, through ports 66, into the bore of sleeve 65, through the ports 67 and through the open end of member 9 into the drill string 2.

With valve 23 in the position shown in Figure 2, packer 6 will not be deflated when the pressure in the drill string is decreased since the valve acts to oppose fluid flow in an upward direction. Thus by maintaining the pressure of the fluid in drill string 2 below that of fluid contained in the strata adjacent the bottom of the well, as by continuing the operation of the bottom hole pump referred to, or by continuing the swabbing operation if that is the procedure employed for removing fluids from the drill string, the flow of fluid from the formation adjacent the porous bed 84 through the passageways indicated, to the inside of the drill string, may be continued until a suitable sample of the fluids from the formation has been drawn through the drill string 2, to the surface of the earth. When a suitable sample has been obtained from the formation, as described, the testing procedure may be completed, so that the elastic packer 6 may then be deflated to be removed from the drill string 2 so as to permit resumption of drilling operations.

As the particular means for reducing the fluid pressure within the drill string above the apparatus of this invention forms no part of the invention, any suitable procedure or apparatus may be employed for the purpose. Thus, for example, instead of swabbing the drill pipe or of employing a bottom hole pump, a conventional evacuated sample chamber may be run into the drill string above the testing apparatus of this invention, suitable means being provided within the drill string to seat the chamber and open the same to effect a reduction in pressure within the production passages referred to, whereby drilling fluid initially present in those passages and fluid produced adjacent the bed 84 will be collected in the sample chamber. An arrangement of this type is disclosed, for example, in U. S. Patent 2,623,594 of Ben W. Sewell, issued December 30, 1952.

It now remains to describe the means and procedure for effecting deflation of the elastic packer 6. This involves reversing the operation of valve 23 from that shown in Figure 2 to that shown in Figure 6, so that the valve will permit flow in the opposite direction through the passageways 24 and 21. Referring to Figures 2 and 6, it will be noted that sleeve 65 is provided with an enlarged ring 49 which engages a depression in valve sleeve 50. Consequently, upward movement of sleeve 65 will cause shoulder 41 to be brought into sealing engagement with valve 23 so that the valve will then act as a check valve in the direction opposite to that shown in Figure 2, i. e. the valve will serve as a deflation valve, permitting upward flow and preventing downward flow of fluid. The valve is shown in the latter position in Figure 6.

It will be noted in Figure 2 that the lower end of sleeve 65 has an annular seal 72 below ports 66. When valve operating sleeve 65 is in its upward position, seal assembly 72 will prevent fluid communication between the bore of sleeve 65 and the bore of tube 90, and will thus co-operate with valve 31 to trap produced fluid within tube 90. This enables an uncontaminated sample of the last portion of fluid produced from the formation under test to be brought to the surface with the tool, since the drilling fluid originally in tube 90 will have been displaced by formation fluid.

Figure 9:
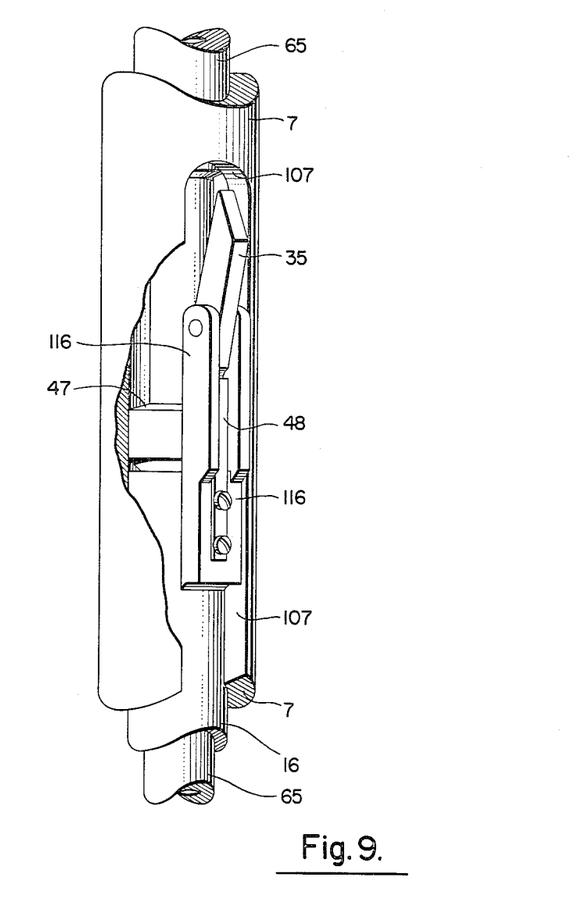
Figure 9 is an enlarged view of a portion of the structure of Figure 4, rotated on its axis through an angle of about 30 degrees.

The mechanism that controls the vertical motion of sleeve 65 relative to member 16 will now be described. Referring to Figures 4 and 9, it will be noted that member 7 adjacent its upper end is provided with a slot 107 in which is positioned a lever 35, pivotally attached to member 116, which is a bifurcated bracket attached to the top of support body 16. Sleeve 65 is provided with an exterior shoulder 47 adapted to engage shoulder 46 of lever 35. Leaf spring 48 fastened to member 116 serves to force lever 35 into the position shown so that positive engagement of shoulders 46 and 47 will be ensured. Referring now to the middle portion of Figure 3, it will be noted that just above the top of annular passage 21, in the region where the bore of support body 16 is reduced to slidably receive sleeve 65, the reduced bore is slightly enlarged to provide an up-facing shoulder 43. Supported on shoulder 43 is a spring 44 which in turn supports an annular enlargement of sleeve 65 indicated by reference numeral 45. Thus sleeve 65 can be moved downward with respect to member 16 to place spring 44 in compression. Upward motion of sleeve 65 by the action of spring 44 can be prevented by engagement of shoulder 46 of lever 35 with shoulder 47 of sleeve 65. It is to be understood that lever 35 is set in the position shown in Figures 4 and 9 before the apparatus is lowered into the drill string. Outer cylinder 9 extends upwardly beyond lever 35 to serve as a protecting sleeve to prevent premature tripping of lever 35 by contact with the inner wall of the drill pipe while the apparatus is being lowered into place.

It is thus seen that, during the steps of inflating packer 6 and of taking a fluid sample from the formation as already described, spring 44 is held under compression. All that is required, therefore, to cause sleeve 65 to move upward with respect to member 16 and thereby shift valve sleeve 50 to reverse the action of valve 23 is to depress lever 35. This will cause shoulder 46 to clear shoulder 47 sufficiently to permit sleeve 65 to slide upwardly with respect to member 16 by action of the force of spring 44. The depressing of lever 35 may be accomplished by dropping or lowering down through the drill string a suitable tripping device.

Figure 5:
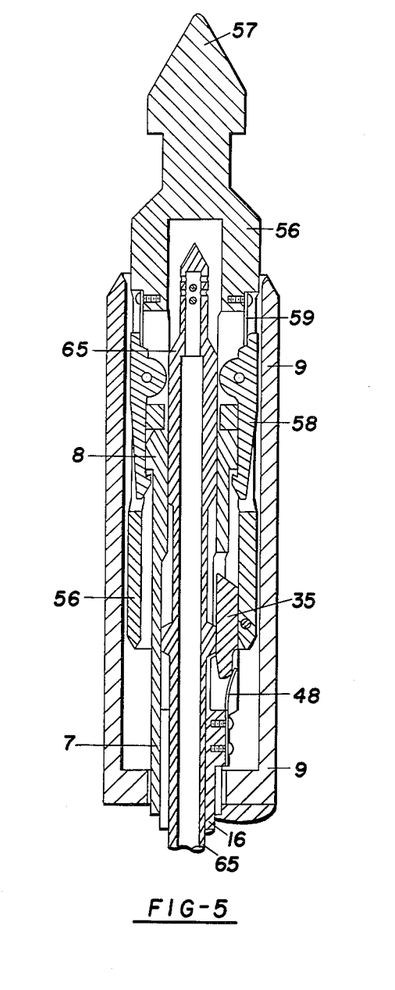
Figure 5 is a repetition of a portion of Figure 4 with a suitable tripping device in place.

In Figure 5 a suitable tripping device 56 is shown lowered in position to shift lever 35 to its vertical position. The device terminates at its upper end in a spearhead 57 so that it can be retrieved by an overshot. The lower end of the device 56 comprises an open cylindrical member having tapered ends to facilitate contact with the lever 35. Consequently by dropping or lowering the device 56 down through the drill string the lower end of the tripping device will move lever 35, permitting spring 44 to move sleeve 65 upward with respect to member 16, and thus move valve sleeve 50 as described, placing valve 23 in the position shown in Figure 6. In this position valve 23 permits upward flow of fluid from annular passage 24 into annular passage 21 and from there into the drill pipe through annulus 120 or annulus 20. Therefore, packer 6 will become deflated since its natural elasticity will draw it inward to the packer support 16 forcing fluid from its interior through the passageways just referred to. The lower diagonal ports 25a ensure that no fluid will be trapped in the lower portion of the packer and prevent its complete collapse.

It will be noted that the tripping tool 56 is provided with latches 58 pivotally attached thereto. These latches will engage spearhead 8 when the tool is lowered into place. As shown in Figure 5 springs 59 ensure positive engagement of the latches 58 with spearhead 8. When spearhead 8 is engaged as described and lifted upwardly, member 7 will first slide upward with respect to packer support body 16 until upwardly facing shoulder 127 on the lower end of member 7 engages downwardly facing shoulder 129 on cylindrical member 9. At the same time the tapered section 10 on member 7 will have engaged the lower ends of latching dogs 11 and cause their upper ends to move inward away from engagement with shoulder 5 at the junction of drill bit 2 and core bit support pipe 3. Thus by the time shoulder 127 is brought into engagement with shoulder 129 cylindrical member 9 will be free to slide upward and will do so relative to support body 16 until upwardly facing shoulder 139 on member 9 engages downwardly facing shoulder 136 on member 16, at which time member 16 and the balance of the testing tool will begin to move upward through the drill pipe. It is thus evident that the entire testing tool can be withdrawn from the drill string by pulling upward on a cable attached to a conventional overshot that is lowered to engage the spearhead 57.

As described, therefore, the apparatus of this invention comprises a body adapted for lowering through a drill pipe into the formation at the bottom of a well. The body is provided with both a mechanical packer and an inflatable elastic packer and with suitable valve mechanisms for inflating and deflating the elastic packer and for obtaining a fluid sample from the bottom of the well. Means are provided so that some of the weight of the drill string may be placed on a portion of the apparatus so that the tester will be firmly embedded in the formation at the bottom of the well and so that the mechanical packer will be caused to seal any passageway from the inside of the drill string, to the outer part of the well below the packer, exclusive of the valve control passageways provided. It is then possible to inflate the packer by increasing the pressure of the fluid within the drill string. Thereafter a sample of the fluid may be withdrawn from the bottom of the well by decreasing the pressure of fluid in the drill string until an adequate sample has been pulled upwardly through the drill string to the surface of the earth or has been drawn into a sample chamber within the drill string. The elastic packer may then be deflated by dropping down the drill string a suitable valve tripping mechanism, which is operative to alter a valve controlling the flow of fluid from the drill string to the inside of the elastic packer to permit the release of fluid within the elastic packer. Thereafter the entire apparatus may be withdrawn from the drill string for continued drilling operations.

It is apparent this invention may be modified in many ways. For example, the particular valve tripping mechanism indicated for causing deflation of the elastic packer is only one of many which might be used. Again, different arrangements of valves can be employed to achieve the same results as those illustrated. It is to be understood, therefore, that the scope of this invention is to be limited only by the appended claims.

What is claimed is:

1. A well testing apparatus adapted to pass down through a drill pipe, comprising an elongated packer support body, a first elastic packing means fixed to said support body in a mid portion thereof, means for expanding said packing means to fill a portion of the annulus between said support body and the drill pipe, a second inflatable elastic packer mounted on said support body below said first packing means, a sampling port in the exterior of said support body below said second packer, a first passageway for fluid within said support body communicating between said port and the interior of said drill pipe above said first packing means, said first passageway providing a path for the travel of sample fluid obtained below said second packer, a second passageway for fluid within said support body communicating between the interior of said inflatable packer and the interior of said drill pipe above said first packing means, said second passageway providing a path for the travel of fluid for the inflation of said inflatable packer, a first valve positioned in said first passageway operative to permit fluid flow from said sampling port to said drill pipe while obstructing flow in the reverse direction, a second valve positioned in said second passageway, said second valve having two operative positions, being operable in the first of said positions to permit fluid flow from the interior of said drill pipe above said first packing means into said inflatable packer and to oppose fluid flow in the opposite direction, and being operable in the second of said positions to permit fluid flow in the latter direction and to oppose fluid flow in the former direction, and means for moving said second valve from one of said operative positions to the other operative position.

2. Apparatus as defined by claim 1 wherein said means for expanding said first packing means comprises an open cylindrical member slidably surrounding said packer support body, a portion of said cylindrical member engaging said first packing means whereby sliding motion of said cylindrical member will expand said first packing means, and latching means attached to said cylindrical member and engageable with the interior of said drill pipe whereby said sliding motion of said cylindrical member can be effected by relative motion between said drill pipe and said support body.

3. Apparatus as defined by claim 1 including means normally biasing said second valve into one of said two positions and releasable latching means opposing said bias.

4. Apparatus as defined by claim 1 wherein said second valve comprises a valve body slidably carried by said packer support body, a valve member positioned within said valve body, spaced valve seats positioned in said valve body above and below said valve member, and compression springs contacting the top and bottom of said valve member, the top valve seat engaging the valve member against the compression of the bottom spring, in one of said operative positions, and the bottom valve seat engaging the valve member against the compression of the top spring, in the other of the said operative positions.

5. Apparatus as defined by claim 4 including an elongate member slidably fitted within said packer support body, spring means within said support body normally urging said elongate member to move in one direction, releasable latching means pivotally attached to said support body and engageable with said elongate member to oppose the action of said last named spring and means mechanically engaging said elongate member with said valve body whereby, when said elongate member is held in a position opposing the action of said last named spring, said valve body will engage said valve member in one of said operative positions, and when said latching means is released the resulting sliding motion of said elongate member will move said valve body to engage said valve member in the other operative position.

6. Apparatus as defined by claim 5 wherein at least a portion of said elongate member extends into said first passageway a spaced distance from said first valve in a manner maintaining fluid flow through said passageway in one slidable position of said elongate member and in a manner closing off said passageway in the other slidable position whereby to trap fluid in said passageway when in said last named position.

7. In a well testing apparatus including an inflatable elastic packer held by a support, and a passageway for fluid through said support into said elastic packer, an improved valve for controlling the direction of fluid flow in said passageway comprising a valve body slidably carried by said support, a valve member positioned within said valve body, said valve member presenting upper and lower sealing faces, spaced valve seats positioned in said valve body above and below said valve member, each of said valve seats being engageable with one of said sealing faces, compression springs contacting the top and bottom of said valve member and means carried by said support to slide said valve body to one of two operative positions, the top valve seat engaging the valve member against the compression of the bottom spring in one of said operative positions, and the bottom valve seat engaging the valve member against the compression of the top spring in the other of said operative positions, the bias of each of said springs when compressed being exerted against said support.

References Cited in the file of this patent

UNITED STATES PATENTS

| | | |
|---|---|---|
| 2,113,856 | Parks | Apr. 12, 1938 |
| 2,176,240 | Bandy | Oct. 17, 1939 |
| 2,176,375 | McClinton | Oct. 17, 1939 |
| 2,192,945 | Toney | Mar. 12, 1940 |
| 2,214,551 | Edwards | Sept. 10, 1940 |
| 2,216,962 | Sewell | Oct. 8, 1940 |
| 2,217,043 | Boynton | Oct. 8, 1940 |
| 2,231,282 | Norris | Feb. 11, 1941 |
| 2,262,655 | Seale | Nov. 11, 1941 |
| 2,285,024 | Ferguson | June 2, 1942 |
| 2,316,024 | Sewell | Apr. 6, 1943 |
| 2,389,512 | Humason | Nov. 20, 1945 |
| 2,418,500 | Chambers | Apr. 8, 1947 |
| 2,497,185 | Reistle | Feb. 14, 1950 |
| 2,521,332 | Blood et al. | Sept. 5, 1950 |